(12) United States Patent
Nakanishi et al.

(10) Patent No.: US 8,860,913 B2
(45) Date of Patent: Oct. 14, 2014

(54) LIQUID CRYSTAL DISPLAY DEVICE, METHOD FOR MANUFACTURING LIQUID CRYSTAL DISPLAY DEVICE, COMPOSITION FOR FORMING PHOTOPOLYMER FILM, AND COMPOSITION FOR FORMING LIQUID CRYSTAL LAYER

(75) Inventors: Yohei Nakanishi, Osaka (JP); Yuichiro Yamada, Osaka (JP); Masanobu Mizusaki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 451 days.

(21) Appl. No.: 13/263,870

(22) PCT Filed: Nov. 18, 2009

(86) PCT No.: PCT/JP2009/069572
§ 371 (c)(1),
(2), (4) Date: Oct. 11, 2011

(87) PCT Pub. No.: WO2010/116565
PCT Pub. Date: Oct. 14, 2010

(65) Prior Publication Data
US 2012/0026442 A1 Feb. 2, 2012

(30) Foreign Application Priority Data
Apr. 8, 2009 (JP) ................. 2009-093756

(51) Int. Cl.
*G02F 1/1337* (2006.01)
*C09K 19/32* (2006.01)
*C09K 19/04* (2006.01)

(52) U.S. Cl.
CPC ........ *G02F 1/133788* (2013.01); *C09K 19/322* (2013.01); *C09K 2019/0448* (2013.01); *G02F 1/133707* (2013.01); *G02F 2001/133742* (2013.01)

USPC ........... 349/123; 349/124; 349/125; 349/126; 349/127; 349/128; 349/129; 349/130; 349/131; 349/132

(58) Field of Classification Search
CPC ........................ G02F 1/1337; G02F 1/133788
USPC .................................... 349/123–136
See application file for complete search history.

(56) References Cited

U.S. PATENT DOCUMENTS 6,805,920 B2 * 10/2004 Nakano et al. ................. 428/1.1
8,345,199 B2 * 1/2013 Hashimoto et al. ........... 349/130
(Continued)

FOREIGN PATENT DOCUMENTS

CN 102077134 A 5/2011
JP 2003-307720 10/2003
(Continued)

OTHER PUBLICATIONS

International Search Report for PCT/JP2009/069572, mailed Feb. 16, 2010.

*Primary Examiner* — Hoan C Nguyen
(74) *Attorney, Agent, or Firm* — Nixon & Vanderhye P.C.

(57) ABSTRACT

The present invention provides a liquid crystal display device producing less image sticking. The liquid crystal display device of the present invention comprises: a pair of substrates; and a liquid crystal layer between the substrates, wherein at least one of the substrates comprises an alignment film and a photopolymer film on the alignment film, the photopolymer film comprises polymers constituted by a photopolymerizable monomer, the photopolymerizable monomer includes two or more polymerizable functional groups, the polymerizable functional groups are bonded to each other through two or more aromatic rings, the aromatic rings include at least one naphthalene ring, and a bond between the naphthalene ring and another aromatic ring has a rotational degree of freedom.

6 Claims, 9 Drawing Sheets

(56) References Cited

U.S. PATENT DOCUMENTS

| | | | |
|---|---|---|---|
| 2005/0116200 A1* | 6/2005 | Nakanishi et al. | 252/299.01 |
| 2005/0259056 A1 | 11/2005 | Hanaoka et al. | |
| 2006/0146243 A1 | 7/2006 | Nakanishi et al. | |
| 2008/0090026 A1 | 4/2008 | Bernatz et al. | |
| 2009/0201453 A1* | 8/2009 | Obi et al. | 349/128 |
| 2010/0165259 A1 | 7/2010 | Nakanishi et al. | |
| 2010/0265448 A1 | 10/2010 | Nakanishi et al. | |
| 2010/0294990 A1* | 11/2010 | Hamada et al. | 252/299.7 |
| 2011/0001913 A1 | 1/2011 | Nakanishi et al. | |
| 2011/0090448 A1 | 4/2011 | Nakanishi et al. | |
| 2011/0090449 A1 | 4/2011 | Nakanishi et al. | |
| 2011/0102720 A1 | 5/2011 | Mizusaki et al. | |
| 2011/0109826 A1 | 5/2011 | Nakanishi et al. | |
| 2011/0109860 A1 | 5/2011 | Nakanishi et al. | |

FOREIGN PATENT DOCUMENTS

| | | |
|---|---|---|
| JP | 2005-338199 | 12/2005 |
| JP | 2006-189610 | 7/2006 |
| JP | 2008-76950 | 4/2008 |
| JP | 2008-116931 | 5/2008 |
| WO | WO 2008/081631 | 7/2008 |

* cited by examiner

LIQUID CRYSTAL DISPLAY DEVICE, METHOD FOR MANUFACTURING LIQUID CRYSTAL DISPLAY DEVICE, COMPOSITION FOR FORMING PHOTOPOLYMER FILM, AND COMPOSITION FOR FORMING LIQUID CRYSTAL LAYER

This application is the U.S. national phase of International Application No. PCT/JP2009/069572 filed 18 Nov. 2009 which designated the U.S. and claims priority to JP Patent Application No. 2009-093756 filed 8 Apr. 2009, the entire contents of each of which are hereby incorporated by reference.

TECHNICAL FIELD

The present invention relates to a liquid crystal display device, a composition for a photopolymer film, and a composition for a liquid crystal layer, and a method for producing a liquid crystal display device. More specifically, the present invention relates to a liquid crystal display device having an alignment film with a photopolymer film formed thereon for the purpose of enhancing control force on liquid crystal alignment; a method for producing a liquid crystal display device in which a photopolymer film is appropriately formed; a composition for a polymer film which is suitable for photopolymer film formation; and a composition for a liquid crystal layer which is suitable for photopolymer film formation.

BACKGROUND ART

Liquid crystal displays are display panels that control transmission/blocking of light (ON/OFF of display) by controlling the alignment of birefringent liquid crystal molecules. Methods for aligning liquid crystal molecules include a rubbing method in which certain treads are formed on an alignment film material applied by a roller or the like so that an alignment film is formed.

Alternatively, as in the multi-domain vertical alignment (MVA) mode, the alignment of liquid crystal molecules may be controlled by means of alignment control structures such as bank-like protrusions comprising a dielectric material extending in an oblique direction on a common electrode and slits formed in parallel with such bank-like protrusions on pixel electrodes, without performing any alignment treatment (see Patent Document 1).

In a liquid crystal display device in the MVA mode, liquid crystal molecules are aligned vertically to a substrate face when a voltage is not applied. When a voltage is applied between a pixel electrode and a common electrode, liquid crystal molecules are aligned at an angle corresponding to the applied voltage. At this time, slits or bank-like protrusions provided in the pixel electrode form a plurality of domains in each pixel. In the domains, the tilt direction of the liquid crystal molecules varies from domain to domain. The display propertied can be enhanced by such formation of a plurality of domains, in which the tilt direction of the liquid crystal molecules varies from domain to domain in each pixel.

Here, a region where slits or protrusions are formed tends to have lower light transmittance. Simplified arrangement of these, and wider spacing between bank-like protrusions or slits of the pixel electrode improves the light transmittance. However, too-large spacing between bank-like protrusions or slits leads to a longer time required to transfer the tilt direction to all the liquid crystals. As a result, the response of liquid crystal molecules becomes poorly slow when a voltage required for display is applied to a liquid crystal layer.

As a method for counteracting such poor response, a method of forming a polymer film on an alignment film (hereinafter, also referred to as "PSA (Polymer Sustained Alignment) technology") is employed, in which polymerizable monomers in liquid crystal materials injected between substrates are polymerized while an voltage is applied thereto so that a polymer film storing a tilt direction of liquid crystal molecules (see Patent Document 2).

Patent Document 2 also discloses a method using a monomer having one or more ring structures or ring-fused structures and two functional groups directly bonded to the ring structures or ring-fused structures, as a polymerizable monomer used in the PSA technology. Such a method is used as a means for solving image sticking which is an afterimage produced when a displayed image is changed after a long-time display of the same image in a liquid crystal display device.

Patent Document 1: JP-A 2006-189610
Patent Document 2: JP-A 2003-307720

DISCLOSURE OF INVENTION

Problems to be Solved by the Invention

The present inventors have investigated monomers used in the PSA technology to find out that image sticking may occur in a liquid crystal display device produced by using monomers including a core portion having a naphthalene group, the monomers being represented by Formula (1):

[Chem. 1]

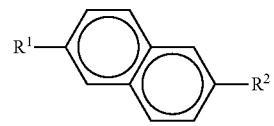

(1)

wherein $R^1$ and $R^2$ are the same as or different from each other and each represent an acrylamide group, a methacrylamide group, an acrylate group, a methacrylate group, a vinyl group, a vinyloxy group, or an epoxy group, or monomers including a core portion having a biphenyl group, the monomers being represented by Formula (2):

[Chem. 2]

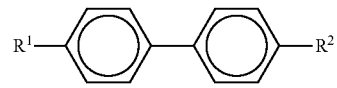

(2)

wherein $R^1$ and $R^2$ are the same as or different from each other and each represent an acrylamide group, a methacrylamide group, an acrylate group, a methacrylate group, a vinyl group, a vinyloxy group, or an epoxy group.

The present invention has been devised in consideration of the present situation and an object thereof is to provide a liquid crystal display device producing less image sticking, a method for producing a liquid crystal display device producing less image sticking, and a composition for a photopolymer film and a composition for a liquid crystal layer which are highly reactive in PSA polymerization.

Means for Solving the Problems

The present inventors have investigated causes of image sticking produced in liquid crystal display devices when the monomers mentioned above are used in the PSA technology to find out the following fact. Monomers including a core portion having a naphthalene group, such as a compound represented by Formula (1), may have electrons localized in the naphthalene group. This allows high polymerization reactivity to some extent. However, when polymerization of one polymerizable functional group is started, the other polymerizable functional group fails to react. As a result, unreacted polymerizable functional groups may remain. In the produced liquid crystal display device, unreacted polymerizable functional groups start being polymerized slowly by photoirradiation from a back light that is used for display in common use. This changes the tilt angle of the polymer film formed using the PSA technology to cause image sticking in display.

The present inventors also found out the following fact. Monomers including a core portion having a biphenyl group, such as a compound represented by Formula (2), may have high polymerization reactivity to some extent, as the biphenyl group is rotatable. The rotatable biphenyl group allows, even when polymerization of one polymerizable functional group is started, the other functional group to have a higher probability to be polymerized. However, less electrons are localized in the biphenyl group compared to the naphthalene group, and therefore, the polymerization rate is delayed. This causes remaining of unreacted polymerizable functional group. In the produced liquid crystal display device, unreacted polymerizable functional groups start being polymerized slowly by photoirradiation from a back light that is used for display in common use. This changes the tilt angle of the polymer film formed using the PSA technology to cause image sticking in display.

The present inventors made further intensive studies based on these findings to find out the following fact. In the case that monomers used in the PSA technology each have at least two polymerizable functional groups, the monomers each preferably have two or more aromatic rings including at least one naphthalene ring which interposes the polymerizable functional groups and a bond having a rotational degree of freedom, such as a single bond and an ether bond, between the naphthalene ring and another aromatic ring. In such a case, electron locality of the naphthalene ring enhances the reaction rate. Further, the rotational degree of freedom of the bond between the aromatic rings improves the polymerization probability to enhance the reaction rate. Accordingly, the reaction rate of the monomers is significantly enhanced. Consequently, in PSA polymerization, a sufficient reaction hardly leaving unreacted functional groups may be carried out in a comparatively short time. In addition, such a sufficient polymerization increases the crosslink density of polymers, resulting in a photopolymer film that is less likely to be deformed by the elastic energy of liquid crystals and the like. This photopolymer film enables production of a liquid crystal display device having a high response speed and producing less image sticking. In this manner, the present inventors have solved the above problems and completed the present invention.

Namely, the present invention is a liquid crystal display device comprising: a pair of substrates; and a liquid crystal layer between the substrates, wherein at least one of the substrates comprises an alignment film and a photopolymer film on the alignment film, the photopolymer film comprises polymers constituted by a photopolymerizable monomer, the photopolymerizable monomer includes two or more polymerizable functional groups, the polymerizable functional groups are bonded to each other through two or more aromatic rings, the aromatic rings include at least one naphthalene ring, and a bond between the naphthalene ring and another aromatic ring has a rotational degree of freedom.

The substrates may include a TFT substrate and a color filter substrate, for example. The TFT substrate comprises a pixel electrode and a switching element such as a thin film transistor (TFT). The TFT and the pixel electrode are connected to each other. This allows control of the liquid crystal alignment on pixel-by-pixel basis. In the color filter substrate, a color filter constituted by three colors of R (red), G (green), and B (blue) is arranged at a position overlapping the pixel electrode of the TFT substrate, and display color is controlled on pixel-by-pixel basis.

At least one of the substrates has an alignment film. Namely, the alignment film is arranged on the surface of one of or both the substrates on the liquid-crystal-layer side. The alignment film controls the alignment of adjoining liquid crystal molecules. In the present invention, the alignment film is not particularly limited as long as it aligns the adjoining liquid crystal molecules, and examples thereof include a rubbing-treated film and a photo-aligned film. In the case that photo-alignment is performed, the alignment film is preferably constituted by materials including a compound including a photoreactive functional group.

At least one of the substrates comprises an alignment film. Namely, a photopolymer film (hereinafter, also referred to as a PSA film (Polymer Sustained Alignment film)) comprising polymers constituted by photopolymerizable monomers on the alignment film. This allows the alignment film to have the enhanced control force on liquid crystal molecules alignment. The term "photopolymer film" here does not necessarily mean a film completely covering the alignment-film surface, and may be a film that is partly not covering or discretely covering the alignment-film surface. In the present description, such a photopolymer film is referred to as a PSA film. A photopolymerizable monomer in the present description refers to a monomer having a functional group to be polymerized by photoirradiation. In addition, light ("phot-") refers not only to visible light, but also to UV light, infrared light and the like. The photopolymer film is a polymer film formed on the alignment film by photopolymerization. Examples thereof include a polymer film formed on the surface of the alignment film on the liquid crystal layer side by photoirradiation under application of a voltage not lower than a threshold voltage to the liquid crystal layer. The photopolymer film allows the alignment film to have enhanced control force on the liquid crystal molecules alignment. This can improve the transmittance by lowering the density of the alignment control structure in the MVA mode.

The photopolymerizable monomer has two or more polymerizable functional groups. The polymerizable functional group in the present description is not particularly limited, as long as it is a functional group in which polymerization reaction is progressed by photoirradiation. Examples thereof include a functional group which directly absorbs light to be activated so that polymerization is initiated, and a functional group in which polymerization is initiated by an added photosensitizer that is easily decomposed by light of a wave length rarely absorbed by the functional group and provides growth active species. Examples of the photopolymerization reaction by the former functional group include photo-initiated polymerization in which light plays a role only in the initiation of polymerization and photopolyaddition in which light plays a role in process of growth. Examples of the photo-initiated polymerization include radical polymerization, ion polymerization (anionic polymerization, cationic polymerization), and ring opening polymerization. The polymerizable functional groups may be the same as or different from each other, and specific examples thereof include an acrylamide group, a methacrylamide group, an acrylate group, a methacrylate group, a vinyl group, a vinyloxy group, and an epoxy group, for each polymerizable functional group. The polymerizable functional group may have a substituent of a halogen group, a methyl group, or the like, in some part.

The polymerizable functional groups are bonded to each other through two or more aromatic rings. The aromatic rings are not particularly limited as long as they belong to aromatic series. Examples thereof include benzene rings, condensed benzene rings (e.g. naphthalene rings, pyrene rings), nonbenzenoid aromatic rings (e.g. tropylium rings, cyclopropenium rings), and heteroaromatic rings (e.g. pyridine rings, pyrrole rings). The aromatic rings may have substituents of halogen groups, methyl groups and the like, in some part. Aromatic rings between two or more polymerizable functional groups shift the absorbance wavelength of the photopolymerizable monomers to longer wavelengths. Therefore, the monomers can be advantageously polymerized by long-wavelength UV rays.

The aromatic rings include at least one naphthalene ring. Since electrons are localized in the naphthalene ring, at least one naphthalene ring in the aromatic rings significantly enhances the polymerization reaction rate. This lowers the possibility that some monomers remain unpolymerized. In addition, the larger number of ring structures of the aromatic rings shift the absorbance wavelength of the photopolymerizable monomers to longer wavelengths. Therefore, from the standpoint of capability of using longer-wavelength UV rays, the aromatic rings preferably include at least one naphthalene ring, rather than a benzene ring. Further, naphthalene has higher solubility to liquid crystals than anthracene and allows efficient progress of the reaction. Therefore, the aromatic rings preferably include at least one naphthalene ring, rather than an anthracene ring.

A bond between the naphthalene ring and another aromatic ring has a rotational degree of freedom. The rotational degree of freedom of the bond between the naphthalene ring and another aromatic ring increases the possibility that, even after polymerization of the polymerizable functional groups is initiated, remaining polymerizable functional groups are bonded with other polymerizable functional groups. Therefore, it is possible to reduce the possibility that some polymerizable functional groups remain unpolymerized. In addition, sufficient polymerization of the unreacted monomers provides a photopolymer film having a high crosslink density and less deformation. Since the bond between the aromatic rings has a rotational degree of freedom in the present invention, the moving range of the polymerizable functional group is wider to the extent that aromatic rings not having a linear structure are included, compared to the case that only a bond between an aromatic ring and a polymerizable functional group has a rotational degree of freedom. This further enhances the reactivity of the polymerizable functional groups. In the present description, the bond is regarded to have a rotational degree of freedom in the following situation. One bond is presumed as one axis, and the axis can make a uniaxial rotation, namely a 360° rotation. Examples of such a bond having a rotational degree of freedom include single bonds, ether bonds, and chain bonds of one type of or both the above bonds (e.g. —$CH_2$—, —XCY—, —XCH—, —$(CH_2)_m$—, (X and Y are the same as or different from each other and each represent a halogen group or a methyl group, and m represents a positive integer)).

The configuration of the liquid crystal display device of the present invention is not especially limited as long as it essentially includes such components. The liquid crystal display device may or may not include other components.

A preferable embodiment of the present invention will be mentioned in more detail below.

Preferably, the substrates each comprise an electrode, and the photopolymer film is formed by polymerization of photopolymerizable monomers under application of a voltage not lower than a threshold voltage to the liquid crystal layer through the electrodes. In the case that photopolymerization is conducted to form the photopolymer film under application of a voltage not lower than a threshold voltage to the liquid crystal layer, namely, under the condition that the tilt of liquid crystal molecules in the liquid crystal layer is changed from the tilt before the voltage application, the obtained photopolymer film is allowed to have an enough alignment control force to reproduce, even prior to the voltage application, the state after the voltage application.

Preferably, the electrode on one of the substrates is a pixel electrode, and the pixel electrode is constituted by a cross-shaped core portion dividing the pixel into four domains and a plurality of branch portions extending from the both sides of the core portion outwardly and obliquely. The pixel here refers to a domain covered with the pixel electrode. A pixel electrode having such a configuration characteristically has a high transmittance compared to the conventional one in the MVA mode, as it does not have alignment control structures such as protrusions (libs) and slits, which have a low light transmittance. However, if the voltage is applied to the liquid crystal layer through a pixel electrode having such a configuration, liquid crystal molecules positioned on the branch portions can tilt in two directions along the extending direction of the branch portions. This causes alignment defect to lower the display quality. In addition, the tilt direction of liquid crystal molecules is controlled only at the end portion of the pixel electrode and in the electric field in the vicinity of the core portion, and therefore, it takes time until the alignment is stabilized only in one direction. The same situation occurs in each of four domains. In contrast, if photopolymerization is conducted to form the photopolymer film under application of a voltage not lower than a threshold voltage to the liquid crystal layer, namely, under the condition that the tilt of liquid crystal molecules in the liquid crystal layer is changed from the tilt before the voltage application, the obtained photopolymer film is allowed to have an enough alignment control force to reproduce, even prior to the voltage application, the state after the voltage application. Accordingly, the alignment defect of liquid crystal molecules does not occur and the liquid crystal molecules quickly tilt in a predetermined direction, leading to excellent display.

The photopolymerizable monomer is preferably a compound represented by Formula (I):

$$P^1\text{-}A^1\text{-}(Z^1\text{-}A^2)_n\text{-}P^2 \qquad (I)$$

wherein $P^1$ and $P^2$ are the same as or different from each other and each represent an acrylamide group, a methacrylamide group, an acrylate group, a methacrylate group, a vinyl group, a vinyloxy group, or an epoxy group; $A^1$ represents a naphthalene-2,6-diyl group; $A^2$ represents a 1,4-phenylene group or a naphthalene-2,6-diyl group; $Z^1$ represents COO, OCO, O, or a direct bond between $A^1$ and $A^2$ or $A^2$ and $A^2$; n represents 1 or 2; and hydrogen atoms contained in $A^1$ and $A^2$ may be substituted by halogen groups or methyl groups.

The present invention also provides a method for producing a liquid crystal display device comprising a pair of substrates and a liquid crystal layer between the substrates, the method comprising the steps of: forming an alignment film on at least one of the substrates; and forming a photopolymer film on the alignment film by polymerization of a polymerizable monomer under application of a voltage not lower than a threshold voltage to a liquid crystal layer, wherein the photopolymerizable monomer includes two or more polymerizable functional groups, the polymerizable functional groups are bonded to each other through two or more aromatic rings, the aromatic rings include at least one naphthalene ring, and a bond between the naphthalene ring and another aromatic ring has a rotational degree of freedom. The production method of the present invention is suitable for producing a liquid crystal display utilizing formation of a photopolymer film on an alignment film as above described.

The production method includes a step of forming a photopolymer film on an alignment film by polymerization of photopolymerizable monomers under application of a voltage not lower than a threshold voltage to a liquid crystal layer. Therefore, the photopolymer film formed is allowed to have an enough alignment control force to substantially reproduce, even prior to the voltage application, the state after the voltage application.

In addition, the photopolymerizable monomers have two or more polymerizable functional groups and the polymerizable functional groups are bonded to each other through two or more aromatic rings. The aromatic rings include at least one naphthalene ring. Accordingly, the polymerization reaction rate is significantly enhanced to reduce the possibility that some monomers remain unpolymerized.

Additionally, the rotational degree of freedom of the bond between the naphthalene ring and another aromatic ring increases the possibility that, even after polymerization of the polymerizable functional groups is initiated, remaining polymerizable functional groups are bonded with other polymerizable functional groups. Accordingly, it is possible to reduce the possibility that some polymerizable functional groups remain unpolymerized.

Such a sufficient polymerization in which polymerizable functional groups hardly remain unpolymerized provides a photopolymer film having a high crosslink density and less deformation, in addition to suppressing of ex-post variation in the pre-tilt angle of the alignment film. The liquid crystal display device obtained therefrom has a high response speed and produces less image sticking. The production method of the present invention provides a photopolymer film having such excellent properties by an exposure in a comparatively short time, leading to excellent productivity.

The present invention further provides a composition for a photopolymer film comprising a photopolymerizable monomer, wherein the photopolymerizable monomer comprises two or more polymerizable functional groups, the polymerizable functional groups are bonded to each other through two or more aromatic rings, the aromatic rings include at least one naphthalene ring, and a bond between the naphthalene ring and another aromatic ring has a rotational degree of freedom.

The composition for a photopolymer film of the present invention is suitably used as a material for the above-described photopolymer film formed on the alignment film. The photopolymerizable monomers have two or more polymerizable functional groups and the polymerizable functional groups are bonded to each other through two or more aromatic rings. The aromatic rings include at least one naphthalene ring. Accordingly, the polymerization reaction rate is significantly enhanced to reduce the possibility that some monomers remain unpolymerized. Additionally, the rotational degree of freedom of the bond between the naphthalene ring and another aromatic ring increases the possibility that, even after polymerization of the polymerizable functional groups is initiated, remaining polymerizable functional groups are bonded with other polymerizable functional groups. Accordingly, it is possible to reduce the possibility that some polymerizable functional groups remain unpolymerized. Such a sufficient polymerization in which polymerizable functional groups hardly remain unpolymerized provides a photopolymer film having a high crosslink density and less deformation. This reduces the possibility of the image sticking when a photopolymer film comprising the composition for a photopolymer film of the present invention is formed on an alignment film of a liquid crystal display device, for example.

The configuration of the composition for a photopolymer film of the present invention is not especially limited as long as it essentially includes such components. The composition for a photopolymer film may or may not include other components.

The photopolymerizable monomer is preferably a compound represented by Formula (I):

$$P^1\text{-}A^1\text{-}(Z^1\text{-}A^2)_n\text{-}P^2 \qquad (I)$$

wherein $P^1$ and $P^2$ are the same as or different from each other and each represent an acrylamide group, a methacrylamide group, an acrylate group, a methacrylate group, a vinyl group, a vinyloxy group, or an epoxy group, $A^1$ represents a naphthalene-2,6-diyl group; $A^2$ represents a 1,4-phenylene group or a naphthalene-2,6-diyl group; $Z^1$ represents COO, OCO, O, or a direct bond between $A^1$ and $A^2$ or $A^2$ and $A^2$; n represents 1 or 2; and hydrogen atoms contained in $A^1$ and $A^2$ may be substituted by halogen groups or methyl groups.

The composition for a photopolymer film of the present invention added to a liquid crystal material enables efficient formation of a photopolymer film by polymerization of polymerizable monomers under application of a voltage not lower than a threshold voltage to a liquid crystal layer. Accordingly, the present invention provides a composition for a liquid crystal layer which contains a liquid crystal material as well as the composition for polymer layers.

Effect of the Invention

The present invention provides a liquid crystal display device having an accelerated response speed and producing less image sticking, as the liquid crystal display device has, on the alignment film, a photopolymer film comprising photopolymerizable monomers with highly-reactive polymerizable functional groups.

BEST MODES FOR CARRYING OUT THE INVENTION

Hereinafter, the present invention is described in more detail by way of embodiments referring to drawings, but the present invention is not limited only to these embodiments.

Embodiment 1

In Embodiment 1, photopolymerizable monomers used for forming a PSA film have two or more polymerizable functional groups. The functional groups are bonded to each other through two or more aromatic rings. The aromatic rings include at least one naphthalene ring. The bond between the naphthalene ring and another aromatic ring has a rotational degree of freedom. The number of the polymerizable functional groups in the photopolymerizable monomers is not particularly limited as long as it is not less than two, and the monomers have a configuration with the above characteristics between any two polymerizable functional groups selected from the entire polymerizable functional groups.

Examples of the photopolymerizable monomers used for formation of a PSA film in Embodiment 1 include a monomer represented by Formula (3):

[Chem. 3]

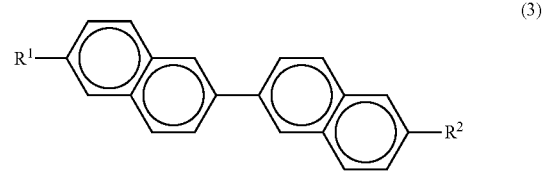

wherein $R^1$ and $R^2$ are the same as or different from each other, and each represent an acrylamide group, a methacrylamide group, an acrylate group, a methacrylate group, a vinyl group, a vinyloxy group, or an epoxy group.

In the compound represented by Formula (3), a core portion for bonding two polymerizable functional groups is constituted by two naphthalene rings. Since electrons tend to be localized in a naphthalene ring, such monomers in which two naphthalene rings are formed between two polymerizable functional groups have polymerizable functional groups that are highly reactive among monomers, resulting in rapid lowering of the monomer concentration by UV irradiation and the like.

Figure 1:
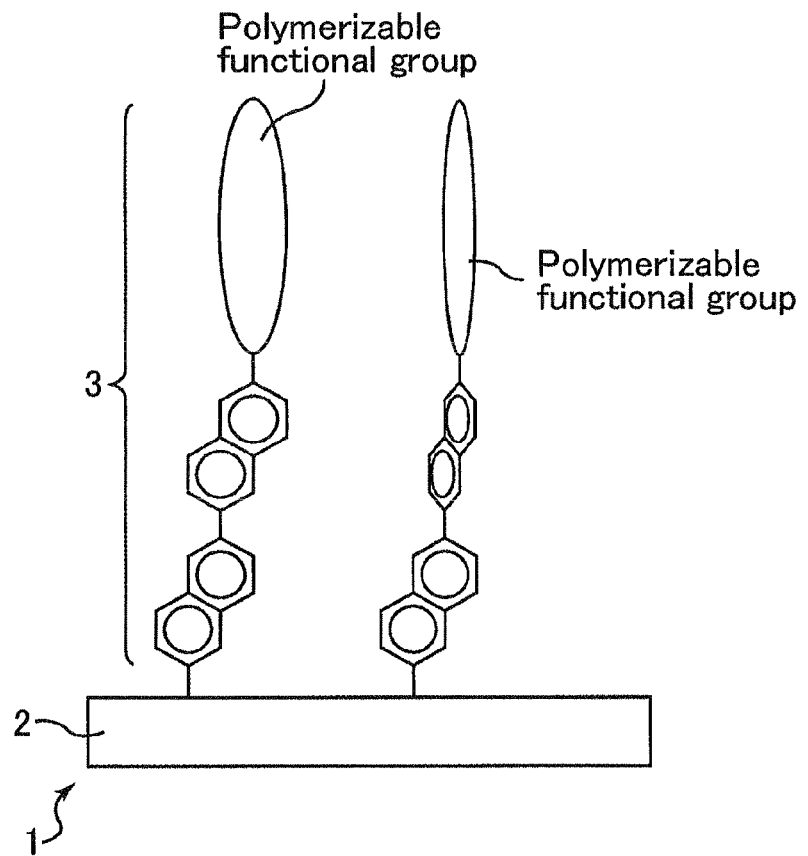
FIG. 1 is a diagram of polymers prepared using a monomer material represented by Formula (3).

Additionally, in the compound represented by Formula (3), the naphthalene rings are bonded to each other through a single bond having a high rotational degree of freedom. FIG. 1 is a diagram of polymers formed using a monomer material represented by Formula (3). As illustrated in FIG. 1, a polymer 1 is constituted by a polymer portion 2 formed by polymerization of one of the polymerizable functional groups and a monomer portion 3 having an unreacted polymerizable functional group extending from the polymer portion 2. Among a plurality of monomer portions 3, a polymerizable functional group of one monomer portion 3 is crosslinkable with a polymerizable functional group of an adjacent monomer portion 3. The single bond of the compound represented by Formula (3) has a high rotational degree of freedom, and therefore, the polymerizable functional groups are more likely to collide with each other as illustrated in FIG. 1, that is, they have high reactivity.

If unreacted polymerizable functional groups remain in the monomer portion 3, a back light in a common usage after completion of the production or aging after completion of the production may initiate the reaction among the unreacted polymerizable functional groups. This may vary the pre-tilt angle of a PSA film. In Embodiment 1, however, the compound represented by Formula (1) used as a material of a PSA film lowers the residual rate of the unreacted polymerizable functional groups. Accordingly, variation in the pre-tilt angle of the PSA film is less likely to occur. In addition, polymers polymerized from such monomers with high reactivity are allowed to have a high crosslink density to have a rigid structure. Accordingly, the possibility that elastic energy of liquid crystal molecules causes deformation is also lowered. As a result, the possibility that the liquid crystal display device produces image sticking is significantly lowered.

Figure 2:
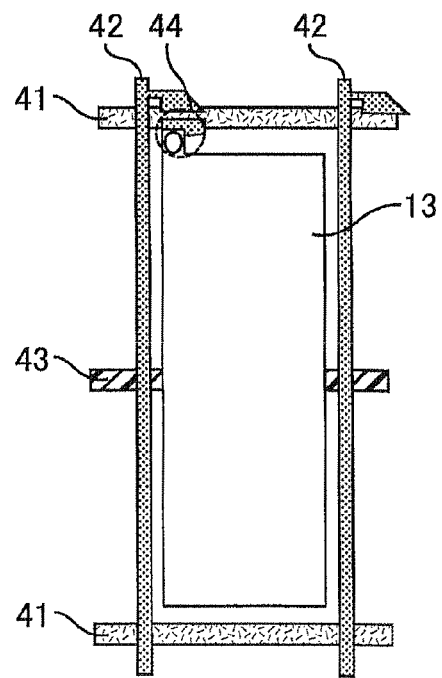
FIG. 2 is a schematic plan view of a pixel unit of an array substrate in a liquid crystal display device of Embodiment 1.

FIG. 2 is a schematic plan view of a pixel unit of a TFT substrate in the liquid crystal display device of Embodiment 1. As illustrated in FIG. 2, each pixel constituting the TFT substrate in the liquid crystal display device of Embodiment 1 has a substantially rectangle shape. A plurality of pixels are arranged in a matrix or in a delta to constitute one display face.

As illustrated in FIG. 2, the TFT substrate in the liquid crystal display device of Embodiment 1 has: a plurality of gate signal lines 41 running in parallel with each other and an storage capacitor (Cs) line 43; a plurality of source signal lines 42 running parallel with each other and across the gate signal lines 41 and the storage capacitor line; and a thin film transistor (TFT) 44 provided in the vicinity of each crossing portion of the gate signal line 41 and the source signal line 42. The TFT 44 is a three-terminal field effect transistor and has three electrodes including a gate electrode, a source electrode, and a drain electrode, in addition to a semiconductor layer. The TFT 44 serves as a switching element for controlling the pixel driving.

Figure 3:
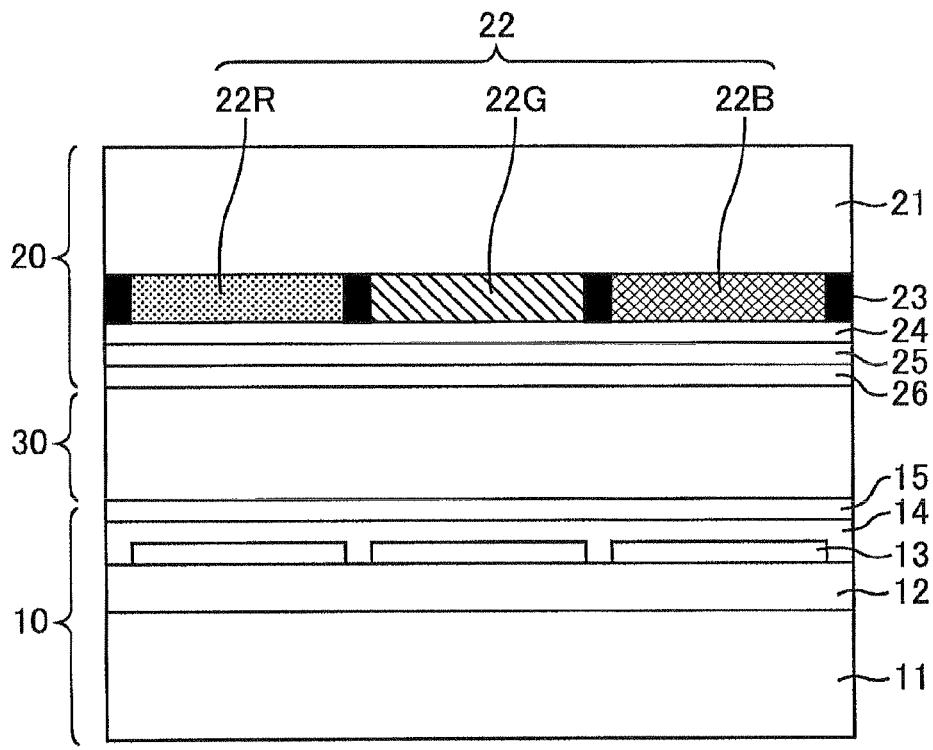
FIG. 3 is a schematic cross-sectional view illustrating the liquid crystal display device of Embodiment 1.

FIG. 3 is a schematic cross-sectional view of the liquid crystal display device of Embodiment 1. As shown in FIG. 3, the liquid crystal display device of Embodiment 1 includes a pair of substrates (i.e. a TFT substrate 10 and a counter substrate 20), and a liquid crystal layer 30 between the TFT substrate 10 and the counter substrate 20.

The TFT substrate 10 includes an insulating transparent substrate 11 such as a glass substrate, lines of various types formed on the transparent substrate 11, pixel electrodes 13, TFTs and the like. The TFT substrate 10 further includes an insulating film 12 formed on the lines of various types and on the TFT, and the plurality of pixel electrodes 13 provided on the insulating film 12. The pixel electrodes 13 each constitute a small pixel and arranged in a matrix with a predetermined spacing. The pixel electrodes 13 are connected to the drain electrode of the TFT through a contact hole provided in the insulating film 12. When the potential of the gate signal line 41 becomes not lower than a predetermined potential, the potential of the source signal line 42 is written to the pixel electrode through the drain electrode of the TFT.

The counter substrate 20 includes: an insulating transparent substrate 21 such as a glass substrate; and color filters 22, a black matrix 23, a common electrode 24 and the like, which are formed on the transparent substrate 21. The common electrode 24 is positioned to interpose a liquid crystal layer 30 with the pixel electrodes 13 and applies a predetermined voltage to the liquid crystal layer 30. The common electrode 24 is formed on the whole surface of the counter electrode 20. The color filters 22 are each constituted by one of three primary colors including a red 22R, a green 22G, and a blue 22B, for example. One color filter 22 corresponds to one pixel electrode 13. Color display can be controlled with this configuration in each pixel, resulting in excellent color display. In addition, the black matrix 23 is formed using a black resin or metal, for example. The black matrix 23 arranged in a space between color filters prevents light leakage.

In the liquid crystal display device of Embodiment 1, the TFT substrate 10, the liquid crystal layer 30, and the counter substrate 20 are stacked in this order from the back surface to the screen side of the liquid crystal display device. The transparent substrate 11 of the TFT substrate 10 has a polarizing plate on its back surface. The transparent substrate 21 of the counter substrate 20 also has a polarizing plate on the screen side. Further, retardation films may be disposed on these polarizing plates, and these polarizing plates may be circularly polarizing plates.

The liquid crystal display device of Embodiment 1 may be of any of a transmission type, a reflection type, and a transflective type. In the case of a transmission or transflective type, the liquid crystal display device of Embodiment 1 is further provided with a backlight in addition to the above constituents. The backlight is disposed on the back surface side of the TFT substrate 10, so that light emitted therefrom passes through the TFT substrate 10, the liquid crystal layer 30 and the counter substrate 20 in this order. In the case of a reflection or transflective type, the TFT substrate 10 is further provided with a light reflector for reflecting external light.

The light reflector may be substituted by wirings and the like in the TFT substrate 10. At least in a region for displaying reflected light, the polarizing plate of the counter substrate 20 should be a circularly polarizing plate provided with a so-called λ/4 retarder.

Figure 4:
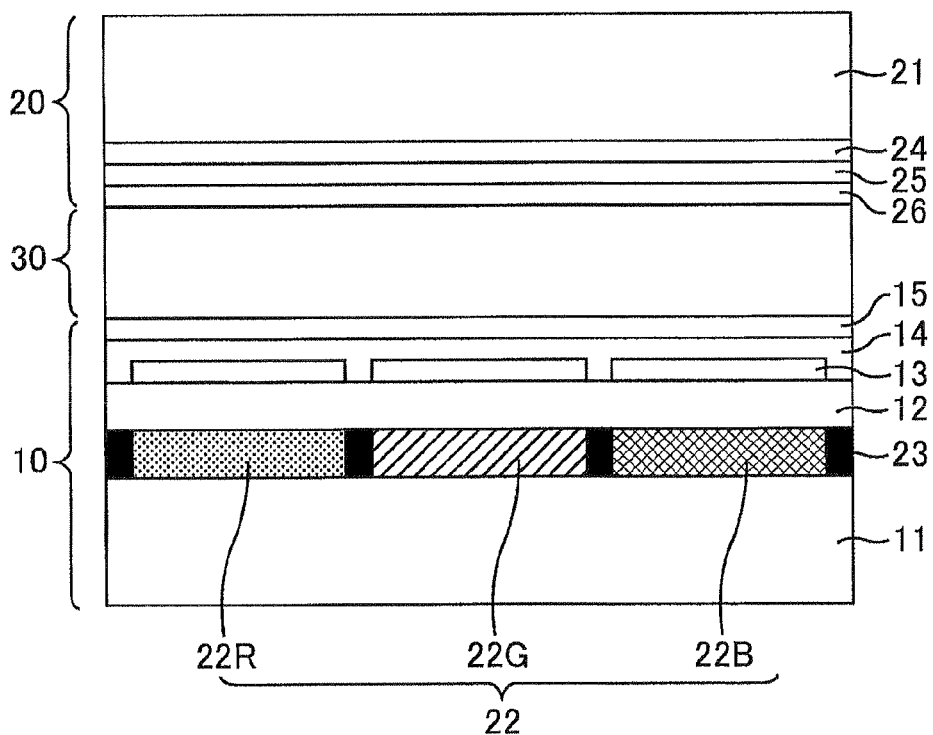
FIG. 4 is a schematic cross-sectional view illustrating another example of the liquid crystal display device of Embodiment 1 and shows an embodiment of a Color Filter On Array configuration.

The color filters 22 in the liquid crystal display device of Embodiment 1 may be arranged on the TFT substrate 10, instead of the counter substrate 20. Such a configuration is referred to as Color Filter On Array. FIG. 4 is a schematic cross-sectional view illustrating another example of the liquid crystal display device of Embodiment 1 and shows an embodiment of a Color Filter On Array configuration.

In the case that the liquid crystal display device of Embodiment 1 is a monochrome display, no color filter is needed.

The liquid crystal layer 30 is filled with a liquid crystal material that is to be aligned in specific directions when a certain voltage is applied. The alignment of the liquid crystal molecules in the liquid crystal layer 30 is controlled by application of a voltage not lower than a predetermined voltage. The control mode of the alignment is not particularly limited, and may be the TN (Twisted Nematic) mode, VA (Vertical alignment) mode, IPS (In-Plane Switching) mode or the like.

An alignment film 14 is arranged on the surface of the pixel electrodes 13 on the liquid crystal layer 30 side. Also, an alignment film 25 is formed on the surface of the common electrode 24 on the liquid crystal layer 30 side. In the VA mode, these alignment films 14 and 25 are preferably vertical alignment films. The alignment films 14 and 25 may be formed by carrying out an alignment treatment on films mainly comprising an organic material. The alignment treatment may be rubbing, photo-alignment, and the like. Here, the alignment films 14 and 25 are not necessarily subjected to the alignment treatment, provided that they can align the liquid crystal molecules in predetermined directions. Formation of the alignment films 14 and 25 provides the liquid crystal molecules prior to the voltage application with a pre-tilt (initial tilt) in predetermined directions.

Formation of the alignment films 14 and 25 are described here. In the case of the rubbing treatment, a solution containing an alignment film material, such as a polyimide resin, dissolved in a solvent is applied by the printing method or the like on the pixel electrodes 13 or the common electrode 24 where an alignment film is to be formed, and is baked at about 200° C. so that a solvent component is evaporated. In this manner, a foundation film is formed. Next, a roller wrapped with a soft cloth called a rubbing cloth is rotated to rub the foundation film in a predetermined direction. In this manner, the alignment direction is given to the film. The pre-tilt angle provided to the liquid crystal molecules by the alignment film formed by rubbing can be controlled by adjusting the rotation speed, rubbing pressure and the like.

In the case of the photo-alignment treatment, namely, in the case of forming a photo-alignment film, a resin material having photofunctional groups is first applied to the surface where an alignment film is to be formed. The photofunctional groups may be photo-coupling type, photo-degradation type, or the like. Examples of the photo-coupling type include polyimides having photosensitive groups such as 4-chalcone, 4'-chalcone, coumarine, and cinnamoyl. Examples of the photo-degradation type include: RN 722, RN 783, RN 784 (each supplied by Nissan Chemical Industries, Ltd); and JALS-204 (supplied by JSR Corporation). The resin material applied is irradiated with, for example, a predetermined amount of UV rays, preferably, polarized UV rays. In this manner, the alignment direction is given. The pre-tilt angle provided to the liquid crystal molecules by the photo-alignment film can be controlled by adjusting the irradiation time, irradiation intensity, type of the photofunctional groups, and the like.

The pre-tilt angle produced by the alignment film 14 and 25 is not particularly limited, and is preferably not smaller than 80° in the VA mode. An alignment film producing such a pre-tilt angle is referred to as a vertical alignment film.

In the liquid crystal display device of Embodiment 1, a PSA (photopolymer film) 15 is provided on the surface of the alignment film 14 on the liquid crystal layer 30 side on the pixel electrodes 13. Moreover, a photopolymer film 26 is provided on the surface of the alignment film 14 on the liquid crystal layer 30 side on the common electrode 24. The PSA films 15 and 26 have a function of reinforcing the maintenance (fixation) of the pre-tilt of liquid crystal molecules determined by the alignment films 14 and 25. The PSA films 15 and 26 may be each formed on the surfaces of the alignment films 14 and 25 on the liquid crystal layer 30 side by the PSA process in which photopolymerizable monomers which start polymerization reaction by photoirradiation in a predetermined amount are chain polymerized. The PSA films 15 and 26 may also be formed by the following process. Namely, a composition for a liquid crystal layer containing photopolymerizable monomers (composition for a photopolymer film) added to/dispersed in a liquid crystal material is injected between a pair of substrates (blank cell) including the TFT substrate 10 and the counter substrate (color filter substrate) 20. Then, the injected composition is irradiated with light (e.g. UV rays) from the TFT substrate 10 side having a higher transmittance under a voltage not lower than a threshold voltage applied to the liquid crystal layer 30. The photopolymerizable monomers are chain polymerized to form PSA films. In the case of producing a liquid crystal display device having a color filter on array configuration as illustrated in FIG. 4, photoirradiation (e.g. UV irradiation) is preferably carried out from the counter substrate 20 side having a higher transmittance. The composition for a photopolymer film may further contain a photopolymerization initiator, photosensitizer, and the like.

The monomer materials, in addition to the compound represented by Formula (3), usable in the liquid crystal display device according to Embodiment 1 are listed below.

[Chem. 4]

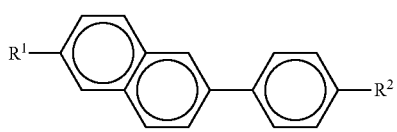

(4)

In the formula, $R^1$ and $R^2$ are the same as or different from each other and each represent an acrylamide group, a methacrylamide group, an acrylate group, a methacrylate group, a vinyl group, a vinyloxy group, or an epoxy group.

In the compound represented by Formula (4), a core portion connecting two polymerizable functional groups is constituted by a naphthalene ring and a benzene ring. Since electrons tend to be localized in the naphthalene ring, at least one polymerizable functional group is highly reactive. When one of the polymerizable functional groups reacts quickly, the degree of freedom of the other functional group is lowered. Therefore, after one of the polymerizable functional groups starts reacting, the other ring is not necessarily a naphthalene ring and may be a benzene ring.

In the compound represented by Formula (4), a naphthalene ring and a benzene ring are bonded to each other through a single bond having a high rotational degree of freedom. Therefore, polymerizable functional groups in monomer portions of polymers in a PSA film to be formed easily collide with other polymerizable functional groups, and are highly reactive.

[Chem. 5]

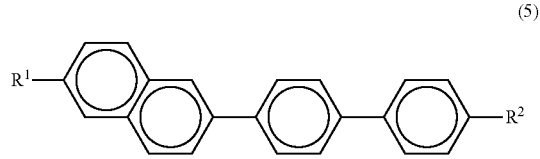

(5)

In the formula, $R^1$ and $R^2$ are the same as or different from each other and each represent an acrylamide group, a methacrylamide group, an acrylate group, a methacrylate group, a vinyl group, a vinyloxy group, or an epoxy group.

In the compound represented by Formula (5), a core portion connecting two polymerizable functional groups is constituted by a naphthalene ring and a biphenyl group. Since electrons tend to be localized in the naphthalene ring, at least one polymerizable functional group is highly reactive. When one of the polymerizable functional groups reacts quickly, the degree of freedom of the other functional group is lowered. Therefore, after one of the polymerizable functional groups starts reacting, the other ring is not necessarily a naphthalene ring and may be a biphenyl group.

Additionally, in the compound represented by Formula (5), the naphthalene ring and the biphenyl group are bonded to each other through a single bond having a high rotational degree of freedom. Further, the biphenyl group itself has a high rotational degree of freedom because of its structure in which two benzene rings are bonded to each other through a single bond. Accordingly, polymerizable functional groups in monomer portions of polymers of a PSA film to be formed easily collide with other polymerizable functional groups, and are highly reactive.

[Chem. 6]

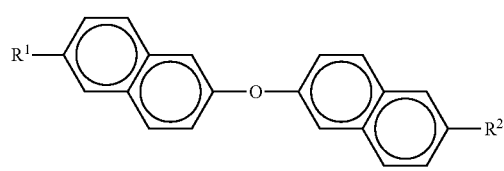

(6)

In the formula, $R^1$ and $R^2$ are the same as or different from each other and each represent an acrylamide group, a methacrylamide group, an acrylate group, a methacrylate group, a vinyl group, a vinyloxy group, or an epoxy group.

In the compound represented by Formula (6), a core portion connecting two polymerizable functional groups is constituted by two naphthalene rings. Since electrons tend to be localized in a naphthalene ring, such monomers in which two naphthalene rings are formed between two polymerizable functional groups have polymerizable functional groups that are highly reactive among monomers, resulting in rapid lowering of the monomer concentration by UV irradiation and the like.

In the compound represented by Formula (6), naphthalene rings are bonded to each other through an ether bond having a high rotational degree of freedom, namely two single bonds interposing an oxygen atom. Causing less bending, the oxygen bond exerts a substantially same effect as the single bond from the standpoint of the rotational degree of freedom. Therefore, polymerizable functional groups in monomer portions of polymers of a PSA film to be formed easily collide with other polymerizable functional groups, and are highly reactive.

[Chem. 7]

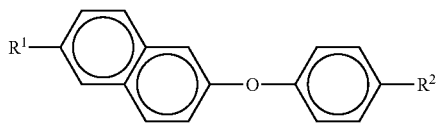

(7)

wherein $R^1$ and $R^2$ are the same as or different from each other and each represent an acrylamide group, a methacrylamide group, an acrylate group, a methacrylate group, a vinyl group, a vinyloxy group, or an epoxy group.

In the compound represented by Formula (7), a core portion connecting two polymerizable functional groups is constituted by a naphthalene ring and a benzene ring. Since electrons tend to be localized in the naphthalene ring, at least one polymerizable functional group is highly reactive. When one of the polymerizable functional groups reacts quickly, the degree of freedom of the other functional group is lowered. Therefore, after one of the polymerizable functional groups starts reacting, the other ring is not necessarily a naphthalene ring, and may be a benzene ring.

In the compound represented by Formula (7), the naphthalene ring and the benzene ring are bonded to each other through an ether bond having a high rotational degree of freedom. Accordingly, polymerizable functional groups in monomer portions of polymers in a PSA film to be formed easily collide with other polymerizable functional groups, and are highly reactive.

[Chem. 8]

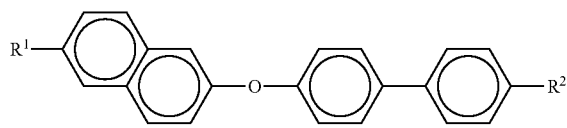

(8)

In the formula, $R^1$ and $R^2$ are the same as or different from each other and each represent an acrylamide group, a methacrylamide group, an acrylate group, a methacrylate group, a vinyl group, a vinyloxy group, or an epoxy group.

In the compound represented by Formula (8), a core portion connecting two polymerizable functional groups is constituted by a naphthalene ring and a benzene ring. Since electrons tends to be localized in the naphthalene ring, at least one polymerizable functional group is highly reactive. When one of the polymerizable functional groups reacts quickly, the degree of freedom of the other functional group is lowered. Therefore, after one of the polymerizable functional groups starts reacting, the other ring is not necessarily a naphthalene ring and may be a biphenyl group.

Additionally, in the compound represented by Formula (8), the naphthalene ring and the biphenyl group are bonded to each other through a single bond having a high rotational degree of freedom. Further, the biphenyl group itself has a high rotational degree of freedom because of its structure in which benzene rings are bonded to each other through an ether bond. Accordingly, polymerizable functional groups in monomer portions of polymers in a PSA film to be formed easily collide with other polymerizable functional groups, and are highly reactive.

The compounds represented by Formulae (4) to (8), as well as the compound represented by Formula (3), lowers the residual rate of the unreacted polymerizable functional groups. Accordingly, variation in the pre-tilt angle of the PSA film is less likely to occur. In addition, polymers polymerized from such monomers with high reactivity are allowed to have a high cross link density to have a more rigid structure. Accordingly, the possibility that elastic energy of liquid crystal molecules causes deformation is also lowered. As a result, the possibility that the liquid crystal display device produces image sticking is significantly lowered.

Among the compounds represented by Formulae (3) to (8), compounds represented by Formulae (3) and (8) having a plurality of naphthalene rings are particularly preferable. Having initial polymerization reaction more easily initiated, such compounds are highly reactive.

Specific examples of the liquid crystal material of the liquid crystal layer include liquid crystal molecules (nematic liquid crystal) having a negative (−0.2 to −10) dielectric anisotropy $\Delta\varepsilon$. The value of $\Delta n$ of the liquid crystal material is preferably 0.02 to 0.3.

The proportion of the photopolymerizable monomers in the composition for a liquid crystal layer is not particularly limited, and is preferably 0.01% to 10% by weight, and more preferably 0.1% to 1.5% by weight. The composition for a liquid crystal layer may be added with a polymerization initiator. As the polymerization initiator, for example, Irgacure 651 (product of Ciba Specialty Chemicals Inc.) or Irgacure 184 (product of Ciba Specialty Chemicals Inc.) may be used. With regard to the concentration of the polymerization initiator, 0.2% to 10% by weight of the polymerization initiator for photopolymerizable monomers accelerates the polymerization rate.

One example of the PSA process includes the steps of preparing a composition for a liquid crystal layer containing a liquid crystal material introduced with 0.6% by weight of the photopolymerizable monomers, injecting the compound for a liquid crystal layer into a blank panel, and conducting irradiation with black light (UV rays having a peak wavelength in a range of 300 to 350 nm) for 5 minutes or longer to polymerize the monomers.

Embodiment 2

Figure 5:
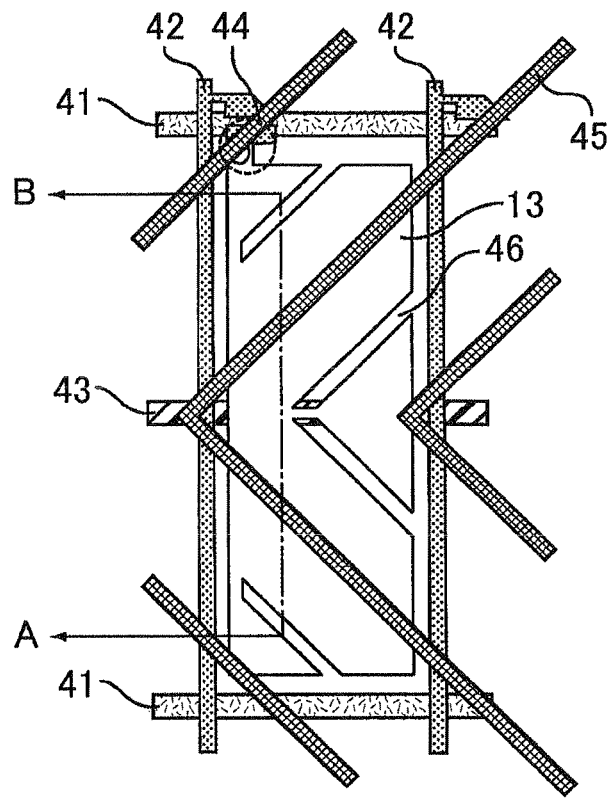
FIG. 5 is a schematic plan view illustrating a pixel constituting a display face of a liquid crystal display device of Embodiment 2.

FIG. 5 is a schematic plan view illustrating a pixel constituting a display face of a liquid crystal display device of Embodiment 2. As illustrated in FIG. 5, each pixel constituting the display face of the liquid crystal display device of Embodiment 2 has a substantially rectangle shape. A plurality of pixels are arranged in a matrix or in a delta to constitute one display face. The liquid crystal display device of Embodiment 2 is different from the liquid crystal display device of Embodiment 1 in that the device is provided with alignment control structures such as protrusions (ribs) including dielectrics formed on the common electrode and slits in the pixel electrode, that is, in the MVA mode. Except for this point, the liquid crystal display device of Embodiment 2 is similar to the liquid crystal display device of Embodiment 1.

As illustrated in FIG. 5, a counter substrate 20 in Embodiment 2 is provided with a plurality of ribs 45 for aligning liquid crystal molecules 50 in a predetermined direction. The ribs 45 are made of an insulating organic resin and are capable of aligning adjacent liquid crystal molecules towards the ribs. Each rib 45 seen from the screen side has a linear shape and the plurality of ribs 45 are formed to overlap with pixel electrodes 13. More specifically, the ribs 45 in Embodiment 1 are arranged in a direction forming an angle of about 45° or 135° with each side of the pixel electrodes 13. One of the plurality of ribs 45 has a bent portion to have a V shape in each pixel. The ribs 45 in Embodiment 2 may partly have branch portions. Moreover, the ribs 45 may be formed in parallel with or vertically to each side. Accordingly, each rib 45 in Embodiment 2 has a straight line shape, U-shape, V-shape, W-shape, or a combinational shape of these, when seen from the screen side.

As illustrated in FIG. 5, the pixel electrodes 13 in an array substrate 10 of Embodiment 2 has a plurality of slits 46 for aligning liquid crystal molecules 50 in a predetermined direction. The slits seen from the screen side have a linear shape and formed in parallel with the rib 45 at a constant interval with the adjacent rib 45. At least one of the plurality of slits 46 has a bent portion to have a V-shape in each pixel. Each slit 46 also has a straight line shape, U-shape, V-shape, W-shape, or a combinational shape of these, when seen from the screen side. The width of the rib and the slit is, for example, 5 to 20 μm.

Figure 6:
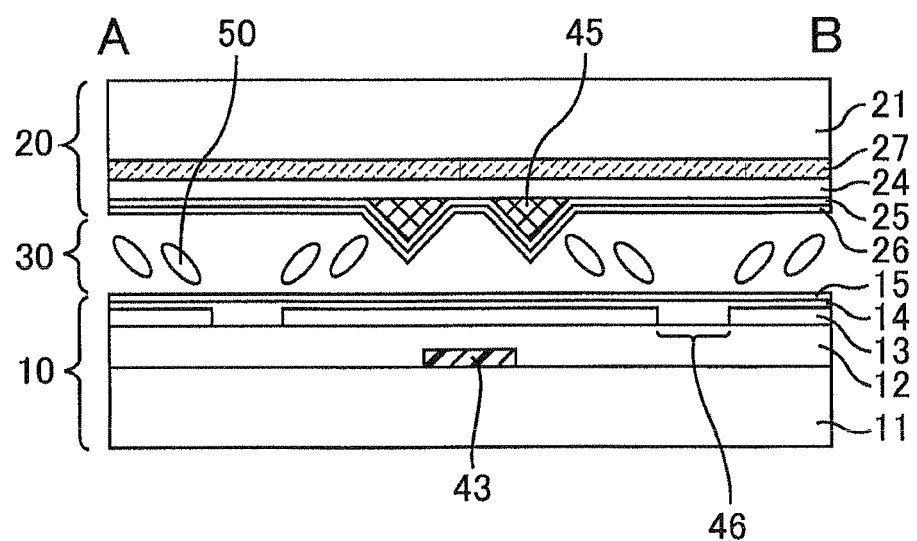
FIG. 6 is a schematic cross-sectional view of the liquid crystal display device of Embodiment 2 and illustrates a cross section taken along a line A-B in FIG. 5.

FIG. 6 is a schematic cross-sectional view of the liquid crystal display device of Embodiment 2 and illustrates a cross section taken along a line A-B in FIG. 5. As illustrated in FIG. 6, the counter substrate 20 has a glass substrate 21; a resin layer 30 including a color filter, black matrix, and the like; a common substrate 24, and the ribs 45 stacked in this order towards the liquid crystal layer 3.

The ribs 45 are made of an insulating organic resin and are capable of aligning the adjacent liquid crystal molecules towards the ribs 45. The ribs 45 in Embodiment 2 have a cone shape projecting towards the liquid crystal layer 30. The cross-section thereof is a triangular shape here. The ribs may have any shape such as a pillar shape and a gabled arch, provided that the rib 45 is projecting towards the liquid crystal layer 30. The cross-sectional shape may also be rectangle, trapezium, parabolic arch and the like.

As illustrated in FIG. 6, the TFT substrate 10 is provided with a glass substrate 11, a storage capacitor line 43, an insulating film 12, and pixel electrodes 13 stacked in this order towards the liquid crystal layer 30. The pixel electrodes 13 in Embodiment 2 have slits 46.

The liquid crystal material constituting a liquid crystal layer between the TFT substrate 10 and the counter substrate 20 is a material having a negative dielectric anisotropy. The liquid crystal material tilts in a substantially vertical direction to the TFT substrate 10 and the counter substrate 20 under application of a voltage not lower than a threshold voltage. In accordance with the voltage applied, the liquid crystal material tilts in a direction parallel with the TFT substrate 10 and the counter substrate 20. It is to be noted that liquid crystal molecules 50 in the liquid crystal layer 30 tilt in a direction vertical to the extending direction of the ribs 45 and the slits 46. Therefore, formation of the ribs 45 and the slits 46 in an oblique direction to the sides of the pixel electrodes 15 realizes wide view angle. The mode of the liquid crystal display device of Embodiment 2 is referred to as MVA mode.

Figure 7:
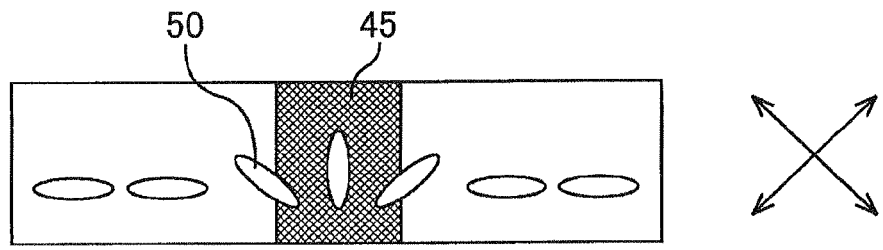
FIG. 7 is a diagram illustrating a domain where liquid crystal molecules overlap with a rib and domains adjacent to the rib, and shows aligning liquid crystal molecules.
Figure 8:
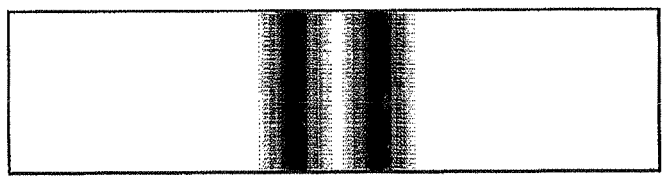
FIG. 8 is a diagram illustrating a domain where liquid crystal molecules overlap with a rib and domains adjacent to the rib, and shows transmission of light.

The liquid crystal display device of Embodiment 2 has the ribs 45 and the slits 46 as described above. Here, the liquid crystal molecules 50 may not be uniformly aligned in some domains because of an influence of the ribs 45 and the slits 46. FIGS. 7 and 8 are diagrams each illustrating a domain where liquid crystal molecules overlap with a rib and domains adjacent to the rib. FIG. 7 shows aligning liquid crystal molecules and FIG. 8 shows transmission of light. The arrows in FIG. 7 indicate directions of the polarization axis. One of the arrows is the polarization axis of the polarization plate on the TFT substrate 10 and the other is the polarization axis of the polarization plate on the counter substrate 20. Namely, the polarization axes of the two polarization plates are orthogonal to each other in the liquid crystal display device of Embodiment 2. As illustrated in FIG. 7, the liquid crystal molecules positioned in a domain where the rib 45 and the slit 46 are overlap to each other are aligned in the same direction as the longitudinal direction of the rib 45 or the slit 46. The liquid crystal molecules positioned in a domain adjacent to the rib 45 or the slit 46 are aligned in an oblique direction forming an angle of about 45° or about 135° with the longitudinal direction of the rib 45 or the slit 46. Then, as illustrated in FIG. 8, the light passing through the liquid crystal molecules positioned in the domain adjacent to the rib 45 or the slit 46 cannot pass through the polarization plate. Accordingly, the frame of the rib 45 or the slit 46 is recognized as a dark line to lower the transmittance.

To solve this problem, it may be considered to set a wider space between the rib 45 and the slit 46 to increase the transmittance. In such a case, however, the alignment of the liquid crystal molecules positioned between the rib 45 and the slit 46 is not determined prior to the voltage application, and therefore, the response speed may be lowered due to the alignment defect upon the voltage application.

Figure 9:
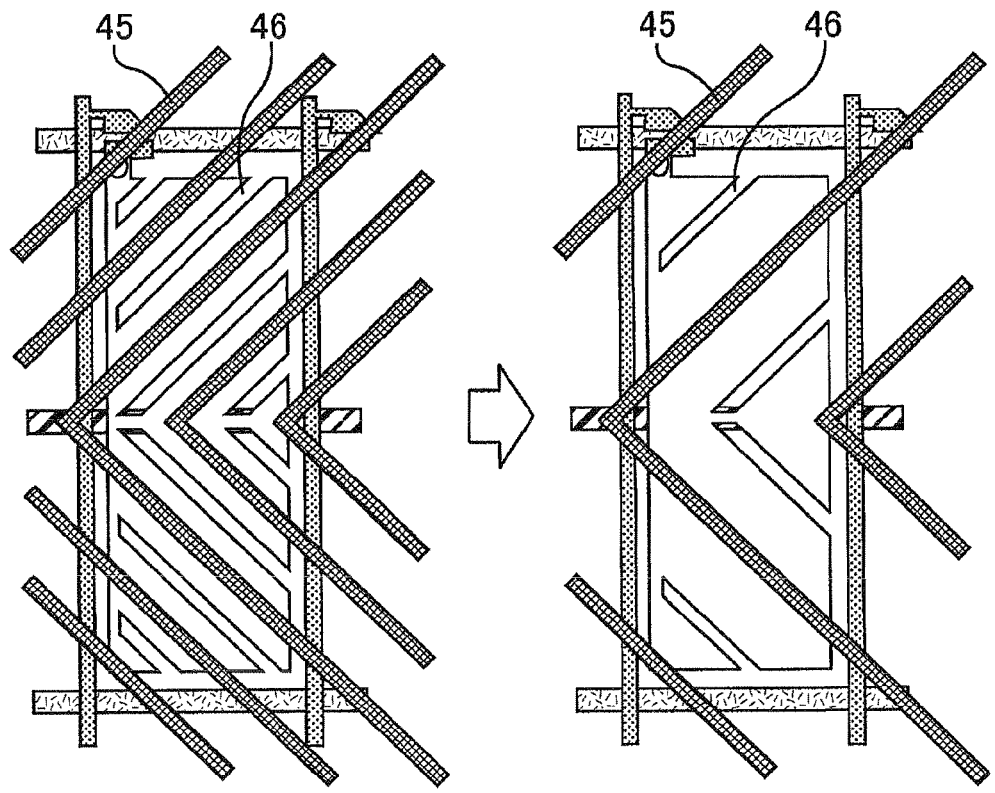
FIG. 9 is a schematic plan view illustrating a pixel constituting a display face of the liquid crystal display device of Embodiment 2 before and after change in the number of ribs.

In contrast, in the liquid crystal display device of Embodiment 2, a liquid crystal material containing the photopolymerizable monomers similar to those in Embodiment 1 is injected and photoirradiation is conducted under application of a voltage not lower than a threshold voltage to polymerize the photopolymerizable monomers. In this manner a PSA film is formed. This determines the alignment of the liquid crystal molecules between the rib 45 and the slit 46. Accordingly, even with a wider space between the rib 45 and the slit 46, the alignment defect upon the voltage application does not occur so that the response speed is not lowered. Specifically, as illustrated in FIG. 9, the number of the ribs 45 and the slits 46 can be halved in the case where a PSA film is formed (shown to the right) compared to the case where a PSA film is not formed (shown to the left). FIG. 9 is a schematic plan view illustrating a pixel constituting a display face of the liquid crystal display device of Embodiment 2 before and after a change in the number of ribs.

According to the liquid crystal display device of Embodiment 2, it is possible to enhance the transmittance without lowering the response speed, as well as achieving a wide view angle based on the ribs 45 and the slits 46. Therefore, the present invention is particularly suitable to be used in the MVA mode.

Embodiment 3

Figure 10:
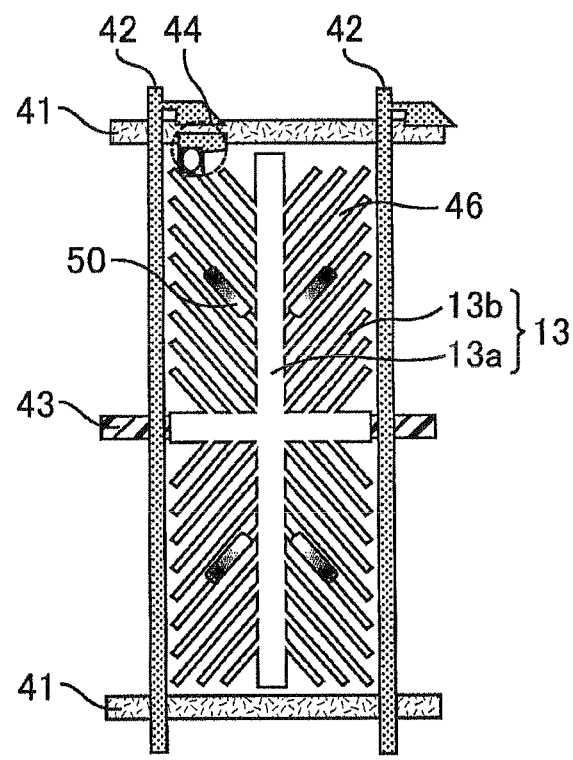
FIG. 10 is a schematic plan view illustrating a pixel constituting a display face of a liquid crystal display device of Embodiment 3.

FIG. 10 is a schematic plan view illustrating a pixel constituting a display face of a liquid crystal display device of Embodiment 3. As illustrated in FIG. 10, pixels constituting the display face of the liquid crystal display device of Embodiment 3 each have a substantially rectangle shape and are positioned in a matrix or in a delta to form one display face. The liquid crystal display device of Embodiment 3 is different from the liquid crystal display device of Embodiment 1 in that it is of the VA-mode in which fine slits 46 are formed as alignment control structures in a pixel electrode 13. Except for this, the liquid crystal display device according to Embodiment 3 is similar to the liquid crystal display device of Embodiment 1.

As illustrated in FIG. 10, in Embodiment 3, the pixel electrode 13 if formed by being finely hollowed. The pixel electrode 13 is constituted by a cross-shaped core portion 13a dividing the pixel into four domains and a plurality of branch portions 13b extending from the sides of the core portion 13a outwardly and obliquely. From the standpoint of improving the view angle, the branch portions 13b positioned in the four domains extend in different directions from domain to domain. Specifically, when the cross-shaped core portion 13a extends in directions forming angles of 0°, 90°, 180°, and 270°, the four domains include a domain where the branch portions 13b extending in a direction at an angle of 45°, a domain where the branch portions 13b extending in a direction at an angle of 135°, a domain where the branch portions 13b extending in a direction at an angle of 225°, and a domain where the branch portions 13b extending in a direction at an angle of 315°.

The width of each branch portion 13b is narrower than that of the core portion 13a. By setting the width of each branch portion 13b and the space between the branch portions 13b sufficiently narrow, the liquid crystal molecules can tilt in a direction parallel to the branch portions 13b upon the voltage application. The electrode width of each branch portion 13b and the space between the branch portions 13b are 1 to 10 µm, and preferably 2 to 7 µm. Here, with regard to the cross-shaped pixel electrode 13 constituting the core portion 13a, the relationship between the width of the side extending in the lengthwise direction and the width of the side extending in the crosswise direction are not particularly limited, and the width may be the same as or different from each other.

If the voltage is applied in this state, the liquid crystal molecules on the branch portions 13b can tilt in two directions along the extending direction of the branch portions 13b. Then, the alignment defect may occur. The liquid crystal molecules finally tilt in a direction towards the center of the pixel electrode and stabilized in that state. However, this takes some time. To solve this problem, a liquid crystal material containing photopolymerizable monomers similar to that used in Embodiment 1 is injected and the photopolymerizable monomers are polymerized by UV irradiation and the like under application of a voltage not lower than a threshold voltage. Then, the alignment direction of the liquid crystal molecules is determined similarly to that in the state after application of a voltage not lower than a threshold voltage, even prior to the voltage application. When the voltage not lower than a threshold voltage is applied, the liquid crystal molecules are aligned in a predetermined direction without producing an alignment defect. According to Embodiment 3, ribs and slits used in Embodiment 2 are not needed and the entire branch portions 13b contribute to the light transmission. Accordingly, the liquid crystal display device of Embodiment 3 is allowed to have higher transmittance compared to the liquid crystal display device of Embodiment 2.

Embodiment 4

A liquid crystal display device of Embodiment 4 is different from the liquid crystal display device of Embodiment 1 in that it is of the RTN (Reverse Twisted Nematic) mode in which the alignment direction is orthogonal between the TFT substrate and the counter substrate and of a type in which each pixel is divided into four domains (4D-RTN). Except for these, the liquid crystal display device of Embodiment 4 is similar to the liquid crystal display device of Embodiment 1.

Figure 11:
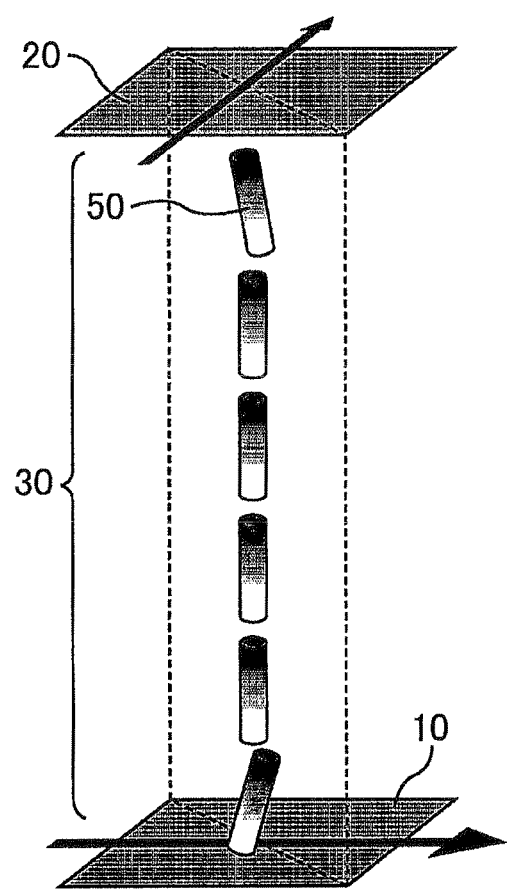
FIG. 11 is a schematic perspective view of liquid crystal molecules, which illustrates a relation between the photo-alignment direction and the pre-tilt direction of liquid crystal molecules in one pixel part of a quadrisectioned pixel in a liquid crystal display device of Embodiment 4, and shows a state in OFF mode (black display).
Figure 12:
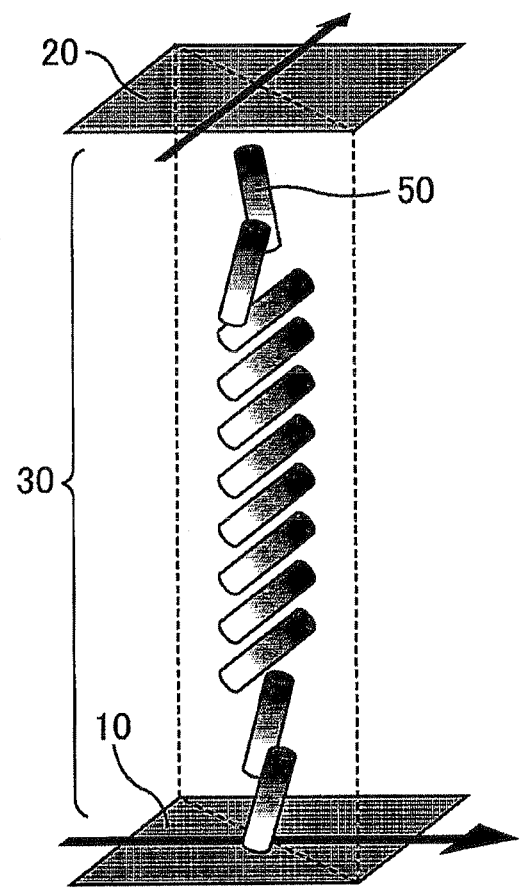
FIG. 12 is a schematic perspective view of liquid crystal molecules, which illustrates a relation between the photo-alignment direction and the pre-tilt direction of liquid crystal molecules in one pixel part of a quadrisectioned pixel in the liquid crystal display device of Embodiment 4, and shows a state in ON mode (white display).

FIGS. 11 and 12 are schematic perspective views of liquid crystal molecules, which illustrate a relation between the photo-alignment direction and the pre-tilt direction of liquid crystal molecules in one pixel part of a quadrisectioned pixel in a liquid crystal display device of Embodiment 4. FIG. 11 shows a state in OFF mode (black display) and FIG. 12 shows a state in ON mode (white display). As illustrated in FIGS. 11 and 12, the liquid crystal display of Embodiment 4 has a pair of substrates including a TFT substrate 10 and a counter substrate 20, and a liquid crystal material containing liquid crystal molecules 50 injected between the pair of substrates. On the surface of the pair of substrates, vertical alignment films are formed. On the surface of the vertical alignment films, PSA films are formed. As illustrated in FIG. 11, the liquid crystal molecules 50 are aligned in a substantially vertical (85° to 89.9°) direction to the faces of the TFT substrate 10 and the counter substrate 20 when the voltage is OFF (state where a voltage lower than a threshold voltage is applied). As illustrated in FIG. 12, the liquid crystal molecules 50 are aligned in a horizontal direction in accordance with the voltage applied, except for the liquid crystal molecules 50 adjacent to the faces of the TFT substrate 10 and the counter substrate 20, when the voltage is ON (state where a voltage not lower than a threshold voltage is applied). Both the TFT substrate 10 and the counter substrate 20 have a vertical alignment film and a PSA film on the surfaces on the liquid crystal layer 30 side. The black arrows in the TFT substrate 10 and the counter substrate 20 in FIGS. 11 and 12 each indicate the tilt direction of the liquid crystal molecules 50. The direction is also a rubbing direction or a photo-alignment direction (photoirradiation direction). As illustrated in FIGS. 11 and 12, in the liquid crystal display device of Embodiment 4, the rubbing direction or photo-alignment direction is different between the TFT substrate 10 and the counter substrate 20. The two directions are orthogonal to each other. Namely, in Embodiment 4, two-domain treatment is conducted to the pixels in the TFT substrate 10 and pixels in the counter substrate 20 so that they are antiparallel with each other. Therefore, respective pixels overlapped to each other provides a RTN structure in which the overlapped pixels are each divided into four domains having different characteristics from each other.

Figure 13:
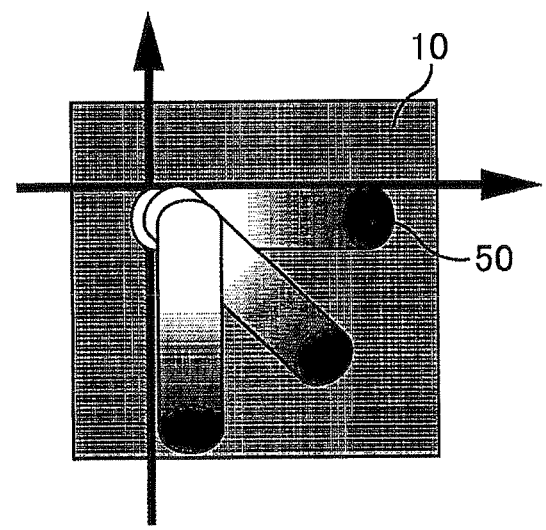
FIG. 13 is a schematic plan view of one pixel part of a quadrisectioned pixel in the liquid crystal display device of Embodiment 4, seen from the counter-substrate side.

FIG. 13 is a schematic plan view of one pixel part of a quadrisectioned pixel in the liquid crystal display device of Embodiment 4, seen from the counter-substrate side. This indicates that the liquid crystal molecule 50 is twisted from the counter substrate 20 side towards the TFT substrate 10 side. The rubbing direction or the photo-alignment direction is orthogonal between the TFT substrate 10 and the counter substrate 20. Therefore, the liquid crystal molecules 50 in one domain has a structure in which they are twisted at about 90° as a whole, as illustrated in FIG. 13.

Figure 14:
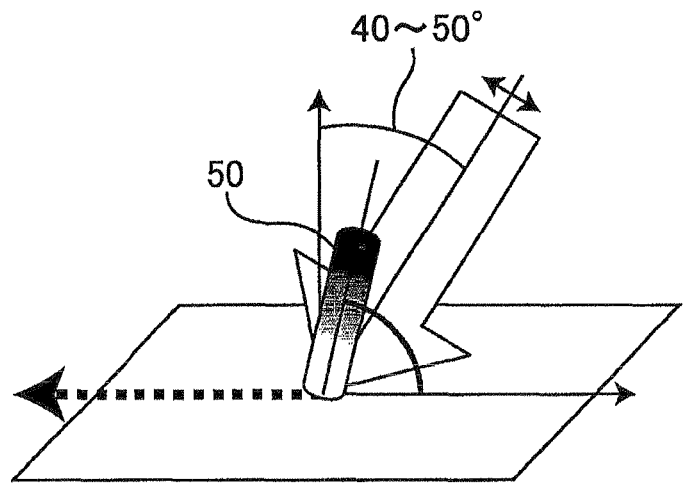
FIG. 14 is a schematic perspective view illustrating a photo-alignment process according to the liquid crystal display device of Embodiment 4.

FIG. 14 is a schematic perspective view illustrating a photo-alignment process according to the liquid crystal display device of Embodiment 4. The alignment film in the liquid crystal display device of Embodiment 4 is made of a resin material having photoreactive functional groups. The alignment provided by photoalignment can be controlled by adjusting the irradiation angle, irradiation intensity, and the like. Therefore, use of a resin material having photoreactive functional groups allows easy configuration of the 4D-RTN (Reversal Twisted Nematic) embodiment in which four different alignment directions are determined in one pixel as in the present embodiment.

A foundation film is irradiated with UV rays (hollow arrow in FIG. 14) polarized in parallel with the incidence face from the direction at an angle of 40° to 50° inclined from the direction perpendicular to the substrate face. Then, the foundation film can be provided with the alignment property tilting the liquid crystal molecules in the same direction as the UV irradiation direction. Here, the inclination of the longitudinal axis of the liquid crystal molecules is the inclination of the liquid crystal molecules prior to the application of a voltage not lower than a threshold voltage, namely, the pre-tilt angle. Exposure may be one-shot exposure or scanning exposure. With regard to the exposure, the substrate and the light source may be fixed while irradiation is carried out, or alternatively, UV scanning may be conducted while irradiation is carried out. The dotted arrow in FIG. 14 indicates the scanning direction of UV rays.

In Embodiment 4, such exposure is carried out on the TFT substrate 10 side and on the counter substrate 20 side so that each pixel is quadrisectioned. In this manner, 4D-RTN is realized.

Figure 15:
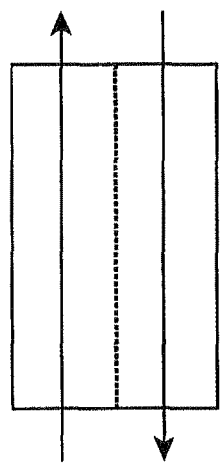
FIG. 15 is a schematic plan view illustrating a formation process of an alignment film in a pixel of the liquid crystal display device of Embodiment 4, and shows a photo-alignment direction on the TFT substrate side.
Figure 16:
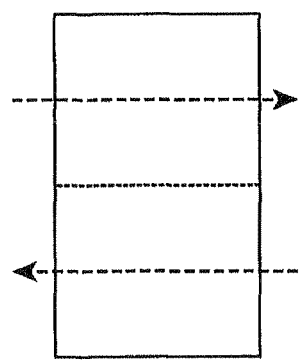
FIG. 16 is a schematic plan view illustrating a formation process of an alignment film in a pixel of the liquid crystal display device of Embodiment 4, and shows a photo-alignment direction on the counter substrate side.

FIGS. 15 and 16 are schematic plan views each illustrating a formation process of an alignment film in a pixel of the liquid crystal display device of Embodiment 4. FIG. 15 shows a photo-alignment direction on the TFT substrate side. FIG. 16 shows a photo-alignment direction on the counter substrate side.

As illustrated in FIG. 15, photo-alignment treatment is conducted to the surface on the TFT substrate side so as to bisection a rectangle pixel in the longitudinal direction (vertical direction) and to set the photo-alignment directions in the divided domains to be opposite to each other. Further, as illustrated in FIG. 16, photo-alignment treatment is conducted to the surface on the counter substrate side so as to bisection a rectangle pixel in the direction of a short side (crosswise direction) and to set the photo-alignment directions in the divided domains to be opposite to each other.

Such a photo-alignment treatment (exposure process) can be carried out by the following steps. First, a photomask having a light shielding portion covering a left/right half of the pixel in the liquid crystal display device is prepared and positioned to shade the left/right half of the pixel. An exposure is performed by longitudinally and unidirectionally irradiating the half domain not covered by a light shielding portion with polarized UV light from the direction at an angle of 40° to 50° inclined from the direction perpendicular to the substrate face. Next, the photomask is slid to the left or right to cover the exposed domain with the light shielding portion. The unexposed domain is then unidirectionally exposed in the opposite way. In this manner, the counter substrate is made to have striped domains each longitudinally halving a pixel. In the adjacent two domains, the direction of the liquid crystal pre-tilt is against to each other.

Next, a photomask having a light shielding portion covering a top/bottom half of the pixel in the liquid crystal display device is prepared and positioned to shade the top/bottom half of the pixel. An exposure is performed by crosswisely and unidirectionally irradiating the half domain not covered by a light shielding portion with polarized UV light from the direction at an angle of 40° to 50° inclined from the direction perpendicular to the substrate face. Next, the photomask is slid to the top or bottom to cover the exposed domain with the light shielding portion. The unexposed domain is then unidirectionally exposed in the opposite way. In this manner, the counter substrate is made to have striped domains each crosswisely halving a pixel. In the adjacent two domains, the direction of the liquid crystal pre-tilt is against to each other.

Figure 17:
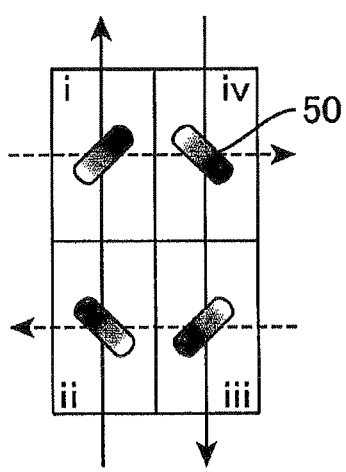
FIG. 17 is a schematic plan view illustrating the alignment of liquid crystal molecules in an alignment film formed by photo-alignment in Embodiment 4, seen from a direction vertical to the substrate face.

FIG. 17 is a schematic plan view illustrating the alignment of liquid crystal molecules in an alignment film formed by photoalignment in Embodiment 4, seen from a direction vertical to the substrate face. The liquid crystal molecules 50 in FIG. 17 indicate liquid crystal molecules positioned in the center portion in a thickness direction of the liquid crystal layer. When an AC voltage not lower than a threshold voltage is applied between the TFT substrate and the counter substrate, liquid crystal molecules have a 90° twisted structure when seen from the direction vertical to the substrate surface. In addition, as illustrated in FIG. 17, liquid crystal molecules positioned in the vicinity of the center in a thickness direction of the liquid crystal layer are aligned in four directions in four domains (i to iv in FIG. 17). As a result, four domains having different alignment states are formed in each pixel.

The present inventors actually applied a material having photoreactive functional groups to a substrate and irradiated the applied material with 50 mJ/cm$^2$ of P-polarized UV rays having a center wavelength of 330 nm from the 40° oblique direction. Then, a photo-alignment film having a pre-tilt alignment of about 88° was formed. In addition, a material for a liquid crystal layer containing a compound represented by Formula (3) was injected between a pair of substrates each having a thus formed photo-alignment film and the substrates were bonded to each other. Then, monomers were polymerized by UV irradiation to a liquid crystal panel without voltage application. As a result a photo-alignment film was formed which has a photopolymer film on its surface and has a pre-tilt alignment of about 88.2°.

Though excellent in improving the view angle, 4D-RTN requires precise pre-tilt control. Here, in accordance with the liquid crystal display device of Embodiment 4, the PSA film formed on the alignment film provides stable pre-tilt. Therefore, the liquid crystal display is allowed to have a wide view angle, as well as sufficient alignment stability, even with 4D-RTN.

The position of ribs or slits in the MVA mode more or less causes lowering of the transmittance. Liquid crystal molecules positioned in the vicinity of the ribs are aligned vertically to the inclined face when the voltage is not applied. Accordingly, the liquid crystal molecules are not vertical to the substrate face and may cause light leakage. Moreover, it may be considered to use narrower fine slits branched from the slits. However, precise control thereof is difficult and variation in width of the fine slits may vary the transmittance to cause unevenness of luminance.

The photo-alignment film is suitably used for pixel electrodes having a simple shape such as rectangles because the tilt direction of liquid crystal molecules can be determined without ribs or slits. Accordingly, a photo-alignment film having well-balanced alignment can be obtained. Absence of ribs or slits enhances the transmittance compared to that in the MVA mode. In addition, absence of ribs reduces light leakage and enhances the contrast in display.

The art utilizing photo-alignment films has been conventionally considered. However, practical applications thereof have been difficult because of image sticking caused by a large residual DC voltage or an unstable pre-tilt angle. According to the present invention, however, the image sticking is significantly reduced even with photo-alignment films. Further, advantages of photo-alignment films, namely, high contrast and high transmittance, are realized.

The present inventors studied to find out that in the liquid crystal display device of Embodiment 4, the transmittance is improved by about 20% and the contrast ratio is roughly doubled compared with that of a conventional MVA liquid crystal display.

The layer structures of the alignment film and the PSA film (photopolymer film), components of monomers for PSA films (photopolymerizable monomers) present in the photopolymer film, photopolymerizable functional groups in the alignment film, and the like can be determined by analyzing the surface of the alignment films of the disassembled liquid crystal display devices of Embodiments 1 to 4 by SEM (Scanning Electron Microscope), TEM (Transmission Electron Microscope), TOF-SIMS (Time-of-Flight Secondary Ion Mass Spectrometry).

Hereinafter, synthesis examples actually carried out to obtain monomers to be used for forming PSA films of the liquid crystal display devices of Embodiments 1 to 4.

SYNTHESIS EXAMPLE 1

The following example is an exemplary synthesis of photopolymerizable monomers having binaphthalene. First, a benzene solution (5 mL) containing 0.5 g (5 mM) of methacrylic acid chloride represented by Formula (10) is dripped to a benzene solution (20 mL) containing 0.7 g (2.5 mM) of (2,2')binaphthalenyl-7,7'-diol represented by Formula (9) and 1 g (10 mM) of triethylamine, at room temperature under nitrogen atmosphere. Then, a reaction was allowed to proceed for two hours at room temperature. After completion of the reaction, impurities were extracted with water. The resulting solution was purified by column chromatography (toluene/ethylacetate (4/1)). As a result, 0.81 g (yield rate 77%) of a target compound (monomers) represented by Formula (11) was obtained.

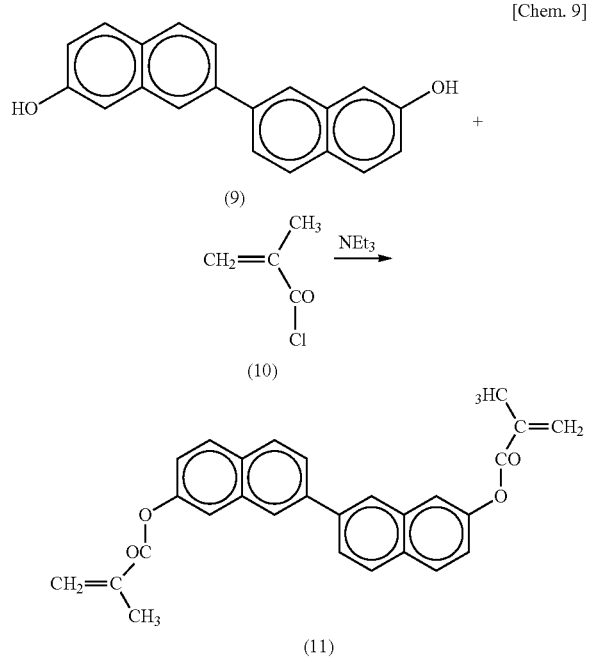

SYNTHESIS EXAMPLE 2

The following example is an exemplary synthesis of photopolymerizable monomers having a naphthalene skeleton. First, an acetone solution (5 mL) containing 0.5 g (5 mM) of 2,6-dihydroxynaphthalene represented by Formula (13) is dripped to an acetone solution (20 mL) containing 1.2 g (5 mM) of 6-bromo-2-naphthol represented by Formula (12) and 1.3 g (10 mM) of potassium carbonate, at room temperature under nitrogen atmosphere. Then, a reaction was allowed to proceed for two hours at room temperature. After completion of the reaction, impurities were extracted with water. The resulting solution was purified by column chromatography (toluene/ethylacetate (4/1)). As a result, 1.31 g (yield rate 87%) of a target compound (monomers) represented by Formula (14) was obtained.

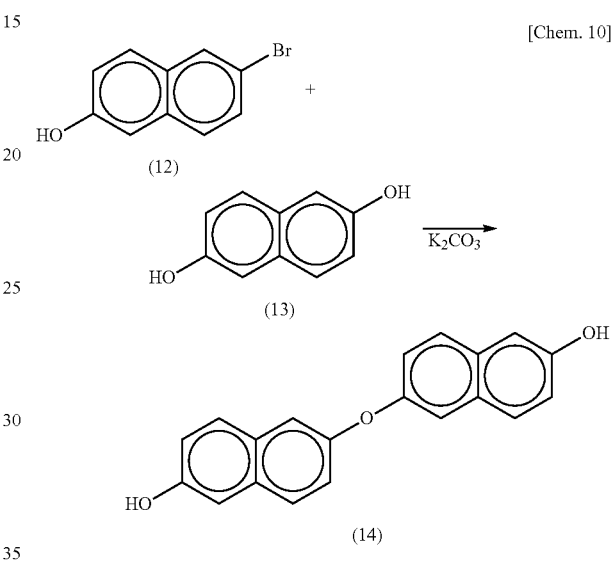

SYNTHESIS EXAMPLE 3

The following example is an exemplary synthesis of another type of photopolymerizable monomers using the photopolymerizable monomers obtained in Synthesis Example 2. First, a benzene solution (5 mL) containing 0.5 g (5 mM) of methacrylic acid chloride represented by Formula (10) is dripped to a benzene solution (20 mL) containing 0.75 g (2.5 mM) of a compound containing diol groups represented by Formula (16) and 1 g (10 mM) of tri-methylamine, at room temperature under nitrogen atmosphere. Then, a reaction was allowed to proceed for two hours at room temperature. After completion of the reaction, impurities were extracted with water. The resulting solution was purified by column chromatography (toluene/ethylacetate (4/1)). As a result, 0.78 g (yield rate 71%) of a target compound (monomers) represented by Formula (15) was obtained.

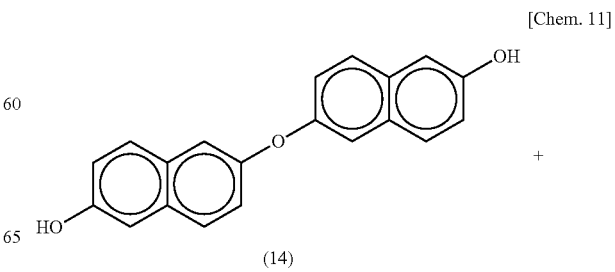

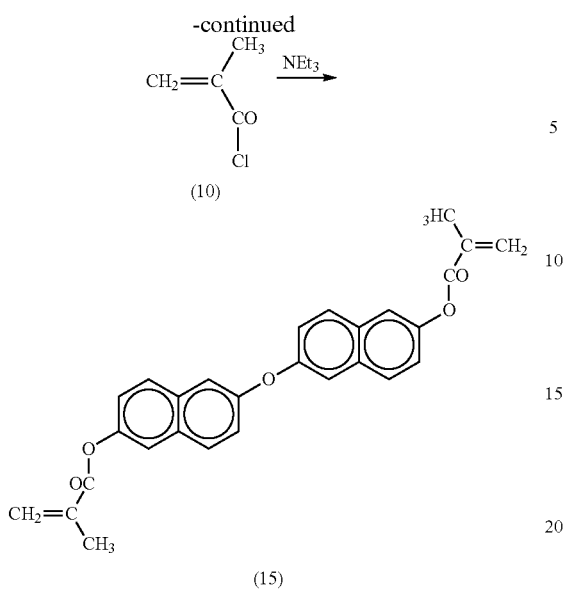

The present application claims priority to Patent Application No. 2009-093756 filed in Japan on Apr. 8, 2009 under the Paris Convention and provisions of national law in a designated State, the entire contents of which are hereby incorporated by reference.

EXPLANATION OF NUMERALS AND SYMBOLS

1. Polymer of PSA film
2. Polymer portion
3. Monomer portion
10. TFT substrate
11. Transparent substrate
12. Insulating film
13. Pixel electrode
13a. Core portion
13b. Branch portion
14. Alignment film
15. PSA film (Photopolymer film)
20. Counter substrate
21. Transparent substrate
22. Color filter
22R. Color filter (Red)
22G. Color filter (Green)
22B. Color filter (Blue)
23. Black matrix
24. Common electrode
25. Alignment film
26. PSA film (Photopolymer film)
27. Resin layer
30. Liquid crystal layer
41. Gate wiring
42. Source wiring
43. Storage capacitor (CS) line
44. TFT
45. Rib
46. Slit
50. Liquid crystal molecules

The invention claimed is:

1. A liquid crystal display device comprising:
a pair of substrates; and
a liquid crystal layer between the substrates,
wherein at least one of the substrates comprises a photo-alignment film and a photopolymer film on the photo-alignment film,
the photopolymer film comprises polymers constituted by a photopolymerizable monomer,
the photopolymerizable monomer includes two or more polymerizable functional groups,
the polymerizable functional groups are bonded to each other through two or more aromatic rings,
the aromatic rings include at least one naphthalene ring,
a bond between the naphthalene ring and another aromatic ring has a rotational degree of freedom, and
the photopolymerizable monomer is a compound represented by Formula (I):

$$P^1\text{-}A^1\text{-}(Z^1\text{-}A^2)_n\text{-}P^2 \qquad (I)$$

wherein $P^1$ and $P^2$ are the same as or different from each other and each represent an acrylamide group, a methacrylamide group, an acrylate group, a methacrylate group, a vinyl group, a vinyloxy group, or an epoxy group; $A^1$ represents a naphthalene-2,6-diyl group; $A^2$ represents a naphthalene-2,6-diyl group; $Z^1$ represents O, or a direct bond between $A^1$ and $A^2$ or $A^2$ and $A^2$; n represents 1 or 2; and hydrogen atoms contained in $A^1$ and $A^2$ may be substituted by halogen groups or methyl groups.

2. The liquid crystal display device according to claim 1, wherein the substrates each comprise an electrode, and
the photopolymer film is formed by chain polymerization of the polymerizable monomer under application of a voltage not lower than a threshold voltage to a liquid crystal layer via the electrode.

3. The liquid crystal display device according to claim 2, wherein the electrode on one of the substrates is a pixel electrode, and
the pixel electrode is constituted by a cross-shaped core portion dividing a pixel into four domains and a plurality of branch portions extending from the both sides of the core portion outwardly and obliquely.

4. The liquid crystal display device according to claim 1, wherein the alignment film is constituted by a material including a compound including a photoreactive functional group.

5. A method for producing a liquid crystal display device comprising a pair of substrates and a liquid crystal layer between the substrates, the method comprising the steps of:
forming a photo-alignment film on at least one of the substrates; and
forming a photopolymer film on the photo-alignment film by chain polymerization of a polymerizable monomer under application of a voltage not lower than a threshold voltage to a liquid crystal layer,
wherein the photopolymerizable monomer includes two or more polymerizable functional groups,
the polymerizable functional groups are bonded to each other through two or more aromatic rings,
the aromatic rings include at least one naphthalene ring,
a bond between the naphthalene ring and another aromatic ring has a rotational degree of freedom, and
the photopolymerizable monomer is a compound represented by Formula (I):

$$P^1\text{-}A^1\text{-}(Z^1\text{-}A^2)_n\text{-}P^2 \qquad (I)$$

wherein $P^1$ and $P^2$ are the same as or different from each other and each represent an acrylamide group, a methacrylamide group, an acrylate group, a methacrylate group, a vinyl group, a vinyloxy group, or an epoxy group; $A^1$ represents a naphthalene-2,6-diyl group; $A^2$ represents a naphthalene-2,6-diyl group; $Z^1$ represents O, or a direct bond between $A^1$ and $A^2$ or $A^2$ and $A^2$; n represents 1 or 2; and hydrogen atoms contained in $A^1$ and $A^2$ may be substituted by halogen groups or methyl groups.

6. The method for producing a liquid crystal display device according to claim 5,
   wherein the step of forming an alignment film comprises a step of performing an aligning treatment by photoirradiation.

\* \* \* \* \*